United States Patent Office 3,050,373
Patented Aug. 21, 1962

3,050,373
DIAGNOSTIC COMPOSITION FOR DETECTING GLUCOSE
Galen F. Collins, Elkhart, Ind., assignor to Miles Laboratories, Inc., Elkhart, Ind., a corporation of Indiana
No Drawing. Filed Dec. 9, 1959, Ser. No. 858,309
13 Claims. (Cl. 23—253)

This invention relates to a novel method and means for the detection and estimation of glucose.

It is a principal object of my invention to provide a simple, rapid, improved means for performing such a test reliably and without the need for extensive equipment or trained personnel.

Though not limited thereto, one of the principal applications of the composition of the present invention is for the detection of glucose in urine and like body fluids, such detection being important not only to diabetics as an aid in controlling their sugar input, but to Public Health officials faced with the problem of rapidly screening large numbers of people to detect the incidence of diabetes among them.

Though there are a number of methods used in detecting or estimating the amount of glucose in urine, their use generally involves a certain amount of skill and familiarity with laboratory equipment, or the methods require the manipulation of liquid reagents, and/or special equipment. In short, it can be said that none of the prior art techniques are completely satisfactory and that, therefore, a more simple, rapid, convenient, and reliable test for detecting glucose in urine would be of tremendous importance in aiding in the control and detection of this disease.

To this end, a test has been developed which is based on the principle of utilizing an enzyme system and an indicator, for the detection of glucose, one form of the test "device" being made by impregnating bibulous material such as filter paper strips with a composition composed of glucose oxidase, peroxidase, an indicator such as o-tolidine which undergoes a color reaction in the presence of hydrogen peroxide and peroxidase, and preferably some buffer system, for maintaining the pH of the composition in the presence of urine at a pH of about 4 to 6. When paper strips or the like which have been so impregnated (and then, preferably, dried) are dipped into urine which contains glucose, a blue color is formed indicating a positive test.

While the aforesaid test is generally quite satisfactory, yet frequently the color which is formed in a positive test is uneven, transitory, evanescent, and a so-called "banding" effect is obtained, which is undesirable and makes more difficult the readings of the test results. Another undesirable feature of the compositions like the aforesaid is the fact that in preparing solutions thereof for absorption onto the filter paper, a precipitate forms, making it very difficult to obtain a uniform impregnation, and therefore uniform results.

I have now found that compositions comprising glucose-oxidase, peroxidase, an indicator such as o-tolidine which undergoes a color reaction in the presence of hydrogen peroxide and peroxidase, a buffer system, preferably one for maintaining the pH of the composition in the presence of urine at a pH of about 4 to 6, and as an essential ingredient a material which exhibits certain solubilizing and/or surface-active properties produces a highly improved test device when such compositions are impregnated into bibulous strips and used for testing urine for glucose.

The addition of compositions having surface-active or solubilizing effects to the foregoing components of the impregnating composition will not only greatly enhance the color formation obtained with a "positive" urine, but what is even more important eliminate the extremely undesirable "banding" effect, the net result being an increase in the ability of the operator making the tests to make more reliable positive determinations.

My invention will be further illustrated by reference to the following detailed examples it being understood that these are illustrative only and not to be construed in a limiting sense.

*Example I*

| | | |
|---|---|---|
| Glucose oxidase (3,070 units/gm.) | mg | 400 |
| Peroxidase (horseradish) | mg | 2.5 |
| o-Tolidine dihydrochloride | mg | 150 |
| Potassium acid phthalate | mg | 1000 |
| "Pluronic F-68" [1] | mg | 1500 |
| Water | ml | 10 |

[1] A polyoxyethylene-polyoxypropylene-polyoxyethylene glycol.

With reference to the activity of glucose oxidase of 3,070 units/gm., it is pointed out that a "unit" is that quantity of enzyme which will cause a rate of oxygen uptake of 10 cubic mm. of oxygen at 30° C. by a solution of glucose contained in a Warburg flask.

In compounding the above formulation, the glucose oxidase, peroxidase, and the "Pluronic F-68" were dissolved in 6 ml. of water and mixed with the o-tolidine dihydrochloride previously dissolved in 4 ml. of water. The potassium acid phthalate was then added and the pH adjusted to 5.3 with 50% sodium hydroxide solution, a clear solution being obtained. Strips of filter paper were then dipped in the solution and dried for one-half hour at 90°–100° F.

These strips, when dipped in glucose-containing urine developed a deep, intense, striking blue coloration, free of the confusing and interfering "banding" phenomenon.

By comparison, formulations like the above, but free of the "Pluronic F-68," when impregnated into filter paper, dried and then dipped into glucose-containing urines, were slow to exhibit color formation, resulted in "banding" and the color which was formed was not as intense or as deep.

Additional formulations, also having improved properties with respect to color formation, were prepared, in which the formula of Example 1 was modified by substituting, for the "Pluronic F-68" a non-ionic surface-active agent, polyoxyethylene sorbitan monolaurate, known as "Tween 20"; a non-ionic surface-active agent known as "Anhydrapent," this being a polyoxyethylene-polyoxypropylene-polyoxyethylene glycol; an anionic surface-active agent known as "Aerosol O.T." (this being the dioctyl ester of sodium sulfosuccinate) found to particularly enhance blue color formation; and the material known as "polyoxyethylene glycol 1500."

Polyoxyethylene glycols having a molecular weight of 500 or more, including the monostearate and monolaurate esters of these glycols can also be used, as can anionics such as sodium lauryl sulfate.

Other compounds which can be used are those containing a polyvinyl chain such as polyvinyl pyrrolidone having, by way of example, an average molecular weight of around 40,000, and polyvinyl alcohol which, by way of example, may consist of 85–99% polyvinyl alcohol, 1–15% polyvinyl acetate, the viscosity of a 4% solution thereof running from about 4–35 centipoises.

This application is a continuation-in-part of my application Serial No. 564,884, filed February 13, 1956.

Since it is obvious that many modifications and variations in the nature and proportions of the aforesaid ingredients may be made without departing from the spirit and scope of the invention, only such limitations should be imposed as are indicated in the appended claims.

I claim:

1. A test indicator for detecting glucose which comprises a bibulous material containing therein a mixture of glucose oxidase, peroxidase, a color forming substance oxidizable by hydrogen peroxide in the presence of said peroxidase, a buffer for maintaining the pH of said mixture at about 4 to about 6 in the presence of urine, and a surface-active agent for enhancing color formation occurring on contact of said indicator with glucose-positive urine.

2. The article of claim 1 wherein the surface-active agent is a polyoxyethylene-polyoxypropylene-polyoxyethylene glycol.

3. The article of claim 1 wherein the surface-active agent is a polyoxyethylene sorbitan monolaurate.

4. The article of claim 1 wherein the said surface-active agent is anionic.

5. The article of claim 1 wherein the said surface-active agent is the dioctyl ester of sodium sulfosuccinate.

6. A test indicator for detecting glucose which comprises a bibulous material which contains therein a mixture of glucose oxidase, peroxidase, a color-forming substance oxidizable by hydrogen peroxide in the presence of said peroxidase, a buffer for maintaining the pH of said mixture at about 4 to about 6 in the presence of urine and a polyoxyethylene glycol for enhancing color formation occurring on contact of said indicator with glucose-positive urine.

7. A test indicator for detecting glucose which comprises a bibulous material which has been contacted with a composition comprising 400 parts of glucose oxidase; 2.5 parts of peroxidase; 150 parts of o-tolidine dihydrochloride; 1000 parts of potassium acid phthalate; 1500 parts of polyoxyethylene-polyoxypropylene-polyoxyethylene glycol for enhancing color formation occurring on contact of said indicator with glucose-positive urine and 10 parts of water.

8. The article of claim 1 wherein the bibulous material is paper.

9. The article of claim 1 wherein the said surface-active agent is a higher fatty acid ester of a polyoxyethylene glycol having a molecular weight of 500 or more.

10. The article of claim 1 wherein the said surface-active agent is an alkali metal salt of a higher fatty acid sulfate.

11. A test indicator for detecting glucose which comprises a bibulous material for containing therein a mixture of glucose oxidase, peroxidase, a color-forming substance oxidizable by hydrogen peroxide in the presence of said peroxidase, a buffer for maintaining the pH of said mixture at about 4 to about 6 in the presence of urine, and polyvinyl pyrrolidone for enhancing color formation occurring on contact of said indicator with glucose-positive urine.

12. A test indicator for detecting glucose which comprises a bibulous material for containing therein a mixture of glucose oxidase, peroxidase, a color-forming substance oxidizable by hydrogen peroxide in the presence of said peroxidase, a buffer for maintaining the pH of said mixture at about 4 to about 6 in the presence of urine, and polyvinyl alcohol for enhancing color formation occurring on contact of said indicator with glucose-positive urine.

13. A test indicator for detecting glucose which comprises a bibulous material for containing therein a mixture of glucose oxidase, peroxidase, a color-forming substance oxidizable by hydrogen peroxide in the presence of said peroxidase, a buffer for maintaining the pH of said mixture at about 4 to about 6 in the presence of urine, and a composition comprising 85–99% polyvinyl alcohol and 1–15% polyvinyl acetate.

References Cited in the file of this patent

UNITED STATES PATENTS

| | | |
|---|---|---|
| 2,185,427 | Brodersen et al. | Jan. 2, 1940 |
| 2,848,308 | Free | Aug. 19, 1958 |

OTHER REFERENCES

Chemical Reviews, "Solubilization," by Klevens, pages 1 to 74 (August 1950), pages 61–66 relied on.

"Pluronics in Water Treating Applications," Wyandotte Chemical Corp. Technical Bulletin, April 7, 1954.

"Atlas Surface Action Agents," Atlas Powder Co. Technical Bulletin, 1950.